(12) United States Patent
Tsuchiyama et al.

(10) Patent No.: US 12,467,587 B2
(45) Date of Patent: Nov. 11, 2025

(54) MANDREL AND TEST PIECE COLLECTING METHOD FOR FILAMENT WINDING

(71) Applicant: HONDA MOTOR CO., LTD., Tokyo (JP)

(72) Inventors: Yusuke Tsuchiyama, Wako (JP); Yuta Urushiyama, Wako (JP); Takeshi Watanabe, Wako (JP); Kosuke Tatsushima, Wako (JP); Hiroyuki Takahashi, Wako (JP); Koji Nozoe, Tokyo (JP); Michael Bruyneel, Alleur (BE)

(73) Assignee: Honda Motor Co., Ltd., Tokyo (JP)

( * ) Notice: Subject to any disclaimer, the term of this patent is extended or adjusted under 35 U.S.C. 154(b) by 147 days.

(21) Appl. No.: 18/240,410

(22) Filed: Aug. 31, 2023

(65) Prior Publication Data

US 2025/0075854 A1    Mar. 6, 2025

(51) Int. Cl.
  *B29C 70/32*  (2006.01)
  *F17C 1/06*  (2006.01)

(52) U.S. Cl.
  CPC ........ *F17C 1/06* (2013.01); *F17C 2201/0104* (2013.01); *F17C 2203/067* (2013.01); *F17C 2203/0673* (2013.01); *F17C 2209/2163* (2013.01)

(58) Field of Classification Search
  CPC .................................................... B29C 70/32
  See application file for complete search history.

(56) References Cited

U.S. PATENT DOCUMENTS

| 3,533,869 | A | * | 10/1970 | Kiyoshi | ................. B32B 27/00 156/173 |
| 4,909,880 | A | * | 3/1990 | Kittelson | ............... B29C 70/32 156/425 |
| 2019/0111609 | A1 | * | 4/2019 | Van Nimwegen | ...... B29C 70/24 |

FOREIGN PATENT DOCUMENTS

| JP | 4-304225 A | * | 10/1992 |
| JP | 2011-058994 A | * | 3/2011 |
| JP | 2023-079047 A |   | 6/2023 |

* cited by examiner

*Primary Examiner* — Jeffry H Aftergut
(74) *Attorney, Agent, or Firm* — Carrier, Shende & Associates P.C.; Joseph P. Carrier; Jeffrey T. Gedeon

(57) ABSTRACT

A mandrel around which fiber-reinforced resin is wound, the mandrel including a cylinder portion having a plurality of first flat surface portions, and a pair of dome portions that are formed at respective ends of the cylinder portion and each include a plurality of second flat surface portions.

7 Claims, 15 Drawing Sheets

MANDREL AND TEST PIECE COLLECTING METHOD FOR FILAMENT WINDING

BACKGROUND OF THE INVENTION

Field of the Invention

The present invention relates to a mandrel and a test piece collecting method for filament winding.

Description of the Related Art

JP 2023-079047 A discloses a high-pressure tank. This high-pressure tank includes a liner having a cylindrical member and dome members provided at respective ends of the cylindrical member, and a reinforcing layer that is made of fiber-reinforced resin and covers the outer circumference of the liner. The reinforcing layer is a layer in which fiber bundles of fiber-reinforced resin are wound and laminated.

SUMMARY OF THE INVENTION

In order to perform a material property evaluation test of the reinforcing layer, it is necessary to collect a test piece from the reinforcing layer. In the material property evaluation test, it is easier to handle a case where the test piece has a flat plate shape than to handle a case where the test piece has a curved shape. With the technology disclosed in JP 2023-079047 A mentioned above, the entire reinforcing layer has a curved shape, and there is a problem that a test piece with a flat plate shape cannot be collected.

The present invention has the object of solving this problem.

An aspect of the present invention is a mandrel around which fiber-reinforced resin is wound, the mandrel comprising: a cylinder portion that has a plurality of first flat surface portions; and a pair of dome portions that are formed at respective ends of the cylinder portion and each have a plurality of second flat surface portions.

According to the present invention, by wrapping the fiber bundles made of fiber-reinforced resin around the mandrel, it is possible to collect a test piece shaped as a flat plate from each of a region of the layered body overlapping a first flat surface portion and a region of the layered body overlapping a second flat surface portion.

The above and other objects, features and advantages of the present invention will become more apparent from the following description when taken in conjunction with the accompanying drawings in which a preferred embodiment of the present invention is shown by way of illustrative example.

DETAILED DESCRIPTION OF THE INVENTION

[Configuration of the Mandrel]

Figure 1:
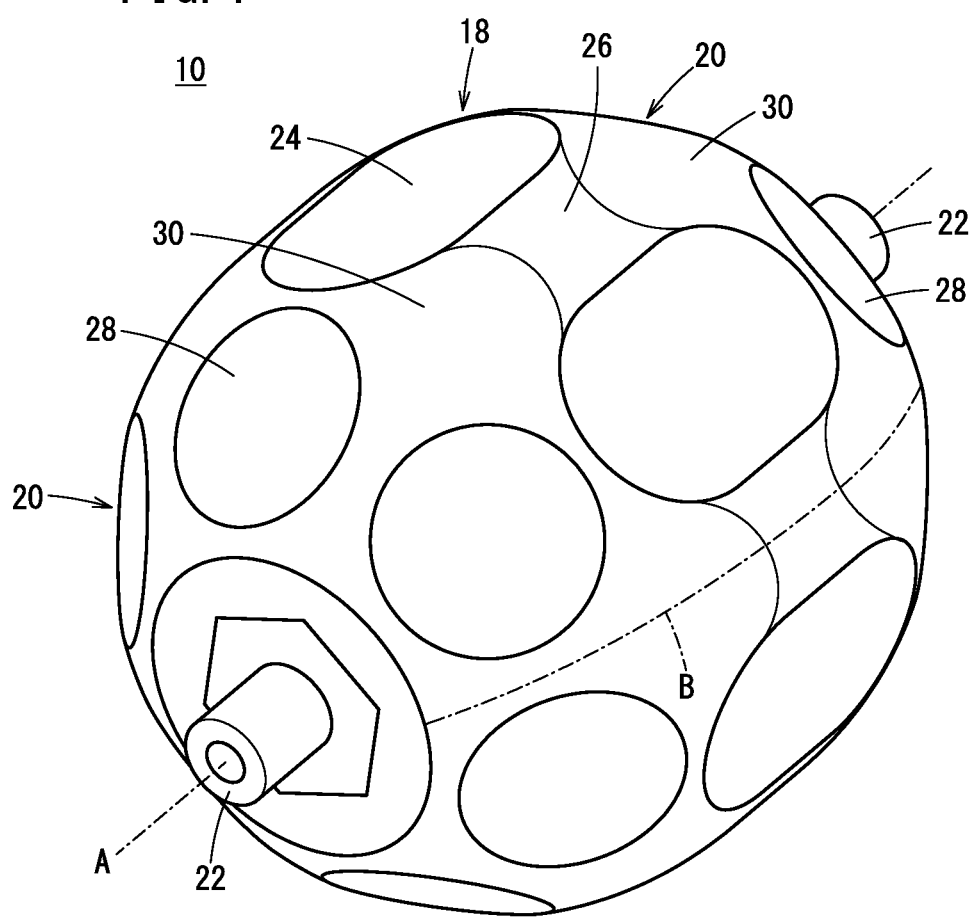
FIG. 1 is a perspective view of a mandrel.
Figure 2:
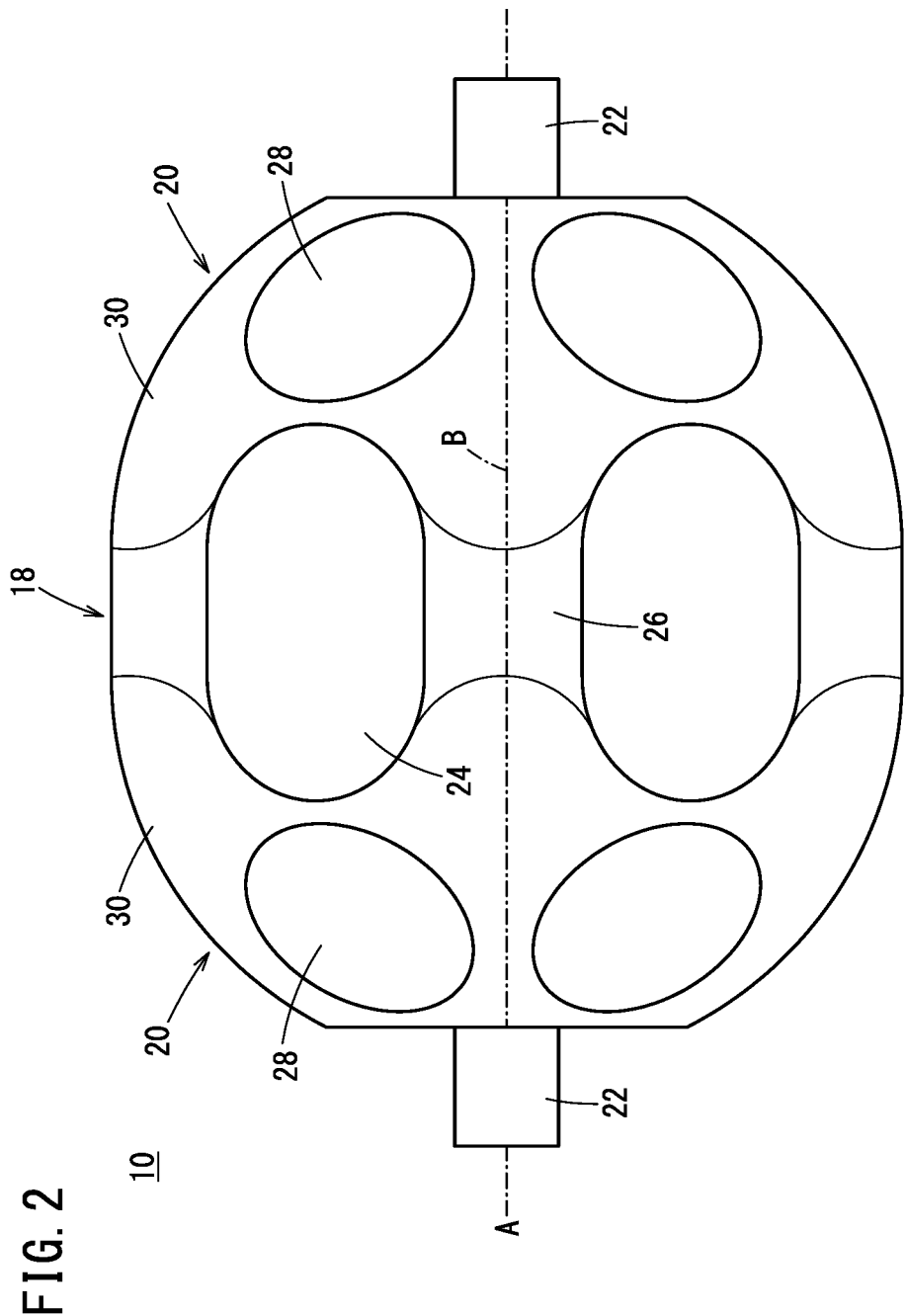
FIG. 2 is a frontal view of the mandrel.
Figure 3:
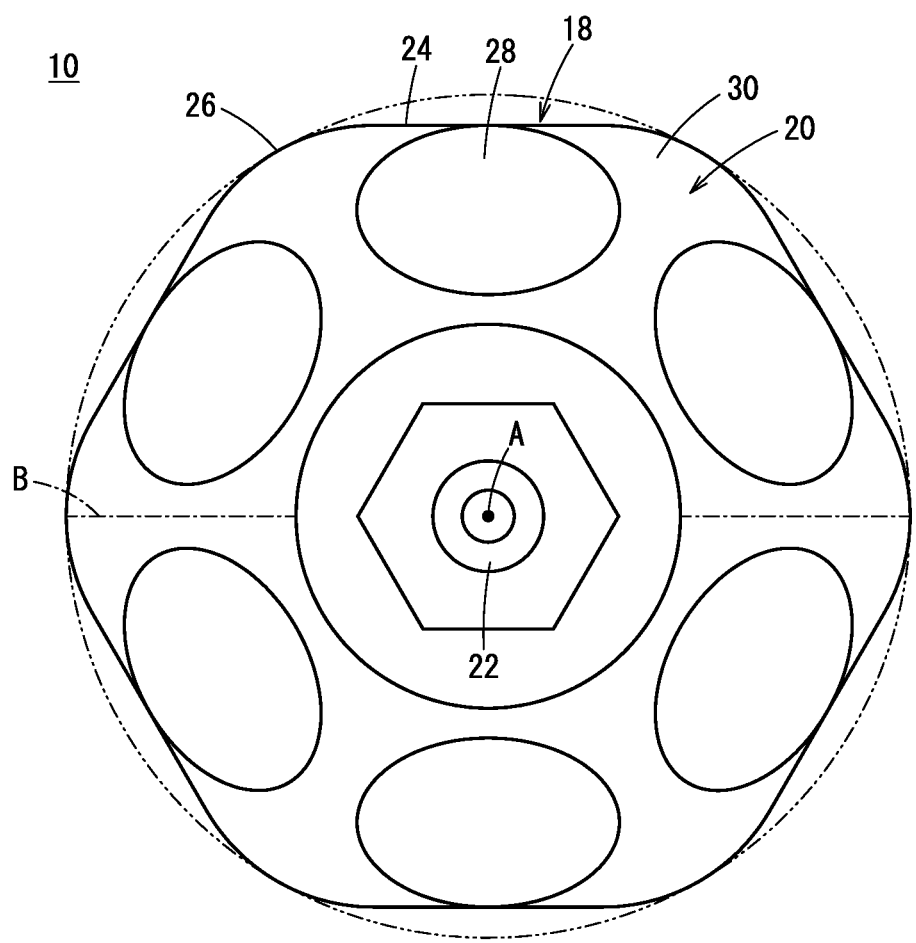
FIG. 3 is a side view of the mandrel.
Figure 4:
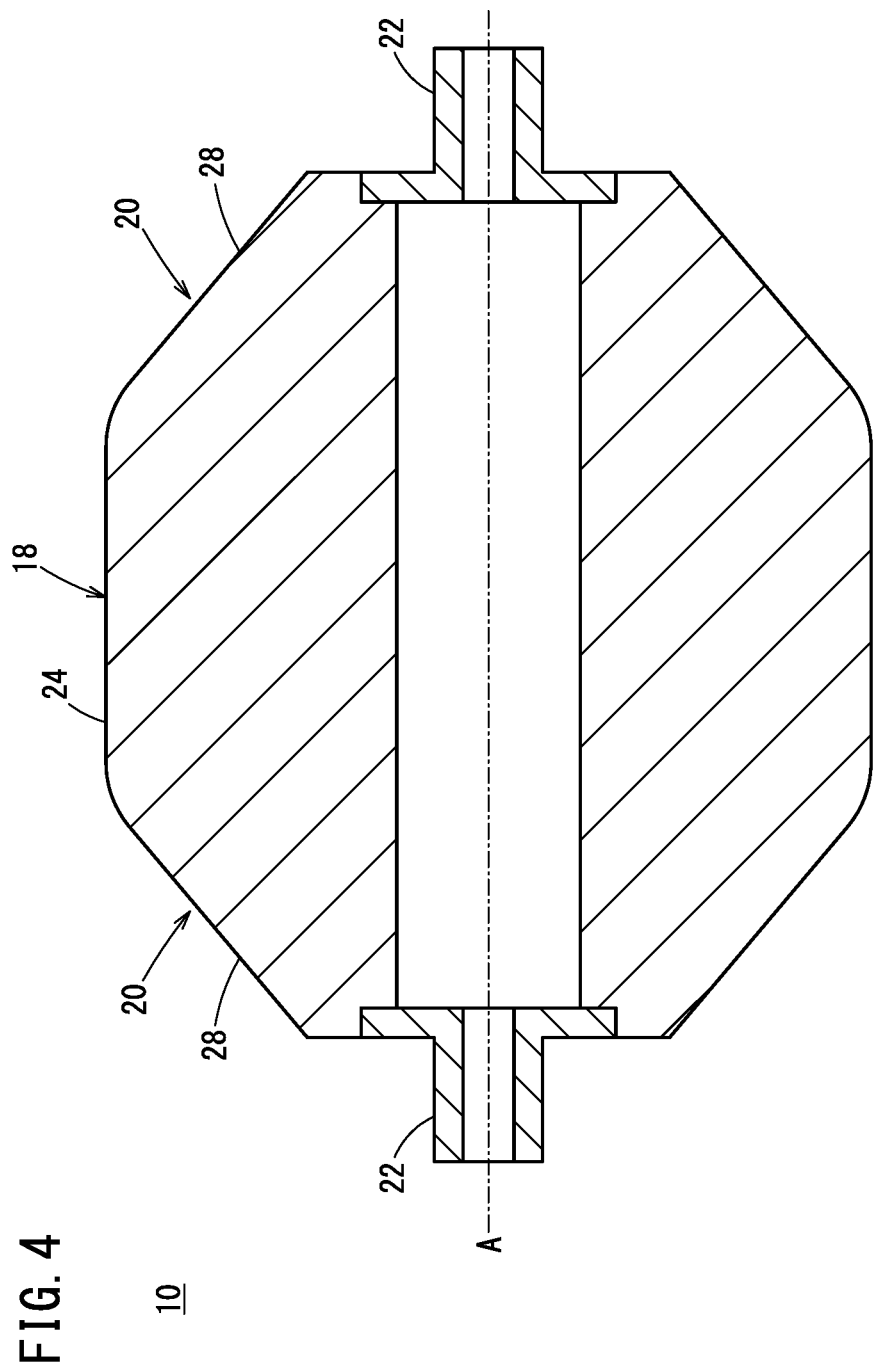
FIG. 4 is a cross-sectional view of the mandrel.
Figure 5:
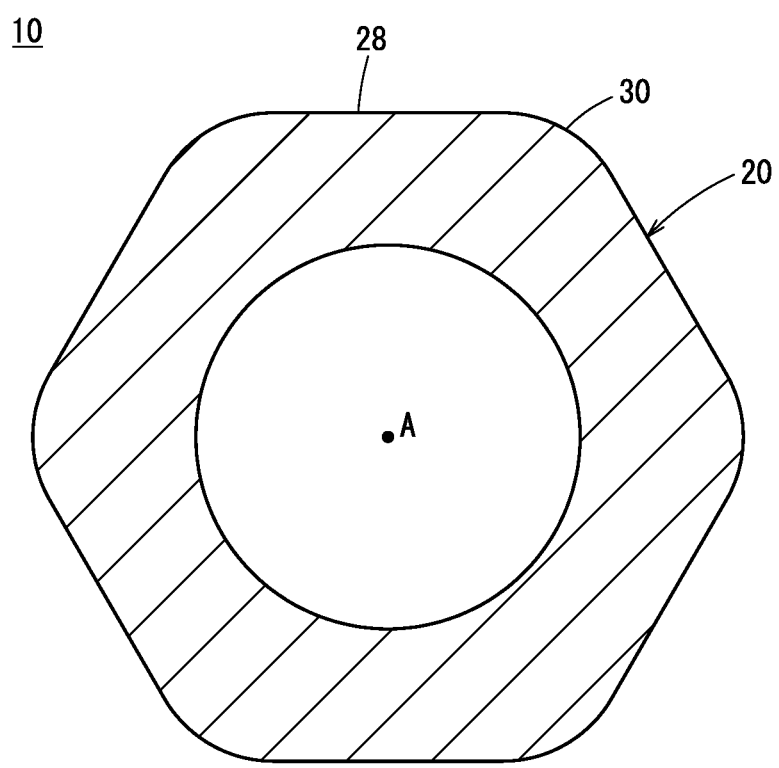
FIG. 5 is a cross-sectional view of the mandrel.

FIG. 1 is a perspective view of a mandrel 10. FIG. 2 is a frontal view of the mandrel 10 seen from a direction orthogonal to a direction in which an axial line A extends. FIG. 3 is a side view of the mandrel 10 seen from the direction in which the axial line A extends. FIG. 4 is a cross-sectional view of the mandrel 10 cut along a plane containing the axial line A. FIG. 5 is a cross-sectional view of the mandrel 10 cut along a plane orthogonal to the axial line A.

The mandrel 10 is formed to imitate the shape of a gas tank liner. This gas tank is, for example, a hydrogen gas tank that is mounted in a fuel cell vehicle and stores hydrogen gas used as fuel gas in the fuel cell vehicle. The gas stored in this gas tank is not limited to hydrogen gas, and may be natural gas or the like. This gas tank is not limited to being mounted in a fuel cell vehicle, and may be mounted in a vehicle that transports gas or in a ground facility that stores gas.

Figure 6:
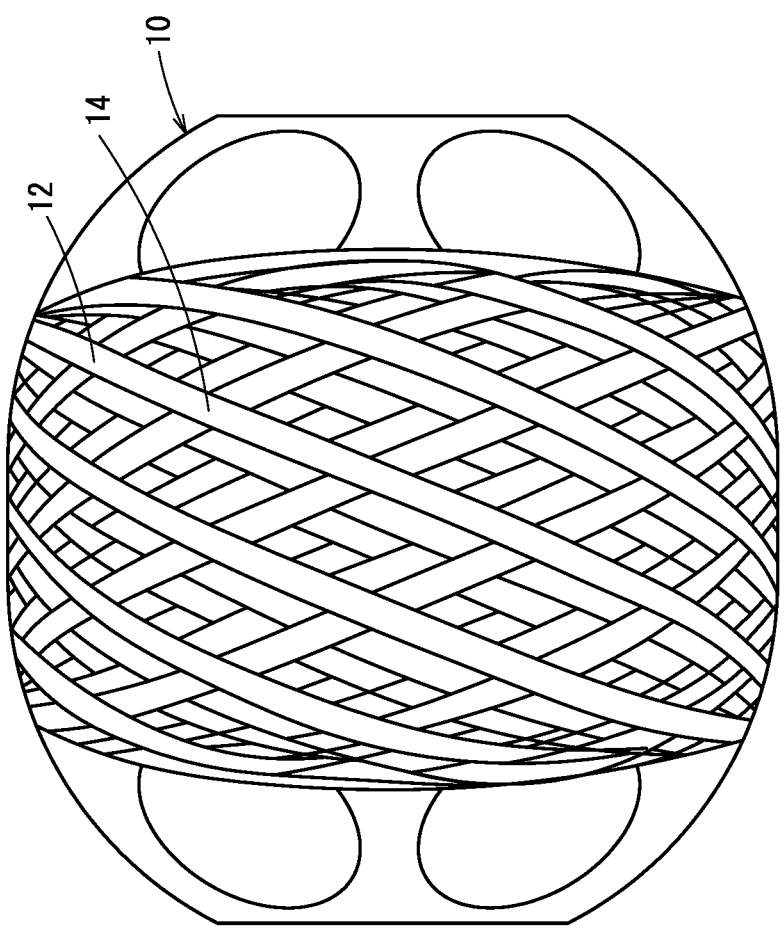
FIG. 6 is a diagram showing a state in which a winding member is wound around the mandrel.
Figure 7:
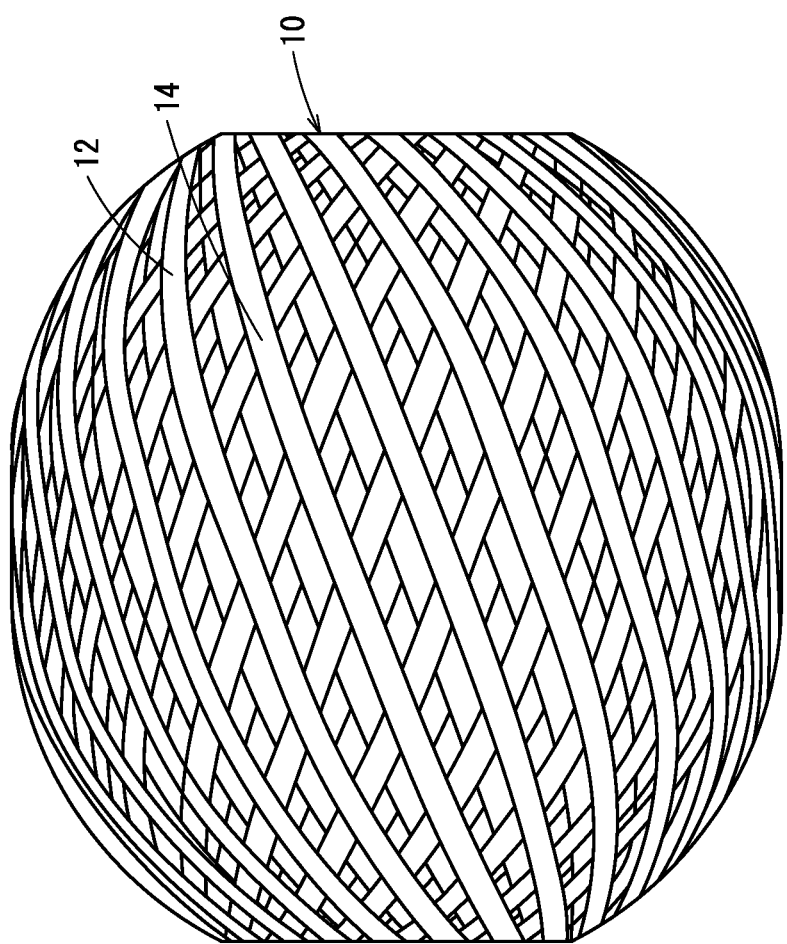
FIG. 7 is a diagram showing a state in which a winding member is wound around the mandrel.
Figure 8:
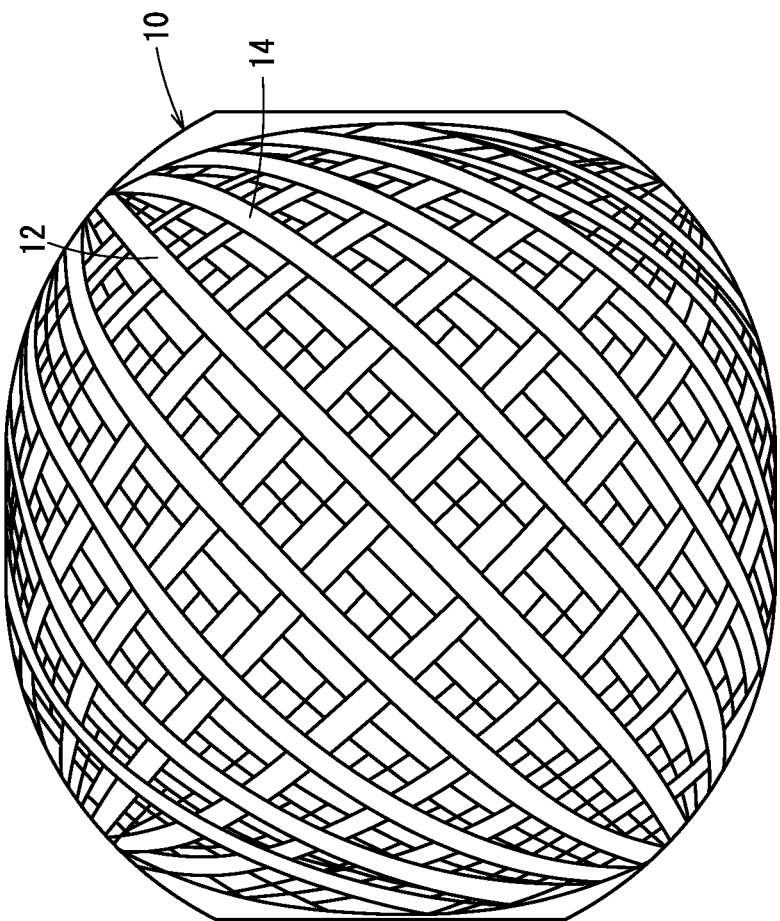
FIG. 8 is a diagram showing a state in which a winding member is wound around the mandrel.

The mandrel 10 is attached to a filament winding device (not shown) that is capable of rotating centered on the axial line A. The filament winding device is a device that winds belt-shaped fiber-reinforced resin around the mandrel 10. The fiber-reinforced resin is a belt-shaped fiber bundle in which fibers are impregnated with resin. In the following, the belt-shaped fiber bundles are also referred to as a wound member 12 (FIGS. 6 to 8). As an example, carbon fiber, glass fiber, or the like are used as the fiber. Epoxy resin or the like, which is a thermosetting resin, is used as the resin. The direction of the fibers of the wound member 12 is along the longitudinal direction of the wound member 12. By winding the fiber-reinforced resin around the mandrel 10, a layered body 14 in which the fiber-reinforced resin is layered is formed (FIGS. 6 to 8).

The layered body 14 is pressurized and heated to harden, in a state of being attached to the mandrel 10. A test piece 16 is collected from the hardened layered body 14 (FIGS. 9 to 14). The test piece 16 is used in the material property evaluation test of the layered body 14.

The mandrel 10 includes a cylinder portion 18, a pair of dome portions 20, and a pair of boss portions 22. The dome portions 20 are formed at respective ends of the cylinder portion 18. The boss portions 22 are attached on the axial line A to the respective dome portions 20. The boss portions 22 are directly attached to the filament winding device, and the filament winding device rotates the boss portions 22.

When the mandrel 10 is viewed from the axial line A direction as shown in FIG. 3, the external shape of the cylinder portion 18 is a hexagonal shape with rounded corners. The external shape of the cylinder portion 18 is not limited to being a hexagon, and needs only be a polygonal shape having five or more vertices.

The cylinder portion 18 includes six first flat surface portions 24 and first curved surface portions 26 that each connects one first flat surface portion 24 to another first flat surface portion 24 adjacent thereto. The inner angle formed between one first flat surface portion 24 and another first flat surface portion 24 is approximately 120°. The inner angle formed between one first flat surface portion 24 and another first flat surface portion 24 needs only be an obtuse angle.

The cross section of the dome portion 20 of the mandrel 10 shown in FIG. 5 has a hexagonal shape with rounded corners. The external shape of the dome portion 20 is not limited to being a hexagon, and needs only be a polygonal shape having five or more vertices.

Each dome portion 20 includes a number of second flat surface portions 28 equal to the number of first flat surface portions 24 of the cylinder portion 18. That is, each dome portion 20 includes six second flat surface portions 28. Each dome portion 20 includes second curved surface portions 30 that each connects one second flat surface portion 28 and another second flat surface portion 28 that is adjacent thereto. The inner angle formed between one second flat surface portion 28 and another second flat surface portion 28 is approximately 120°. The inner angle formed between one second flat surface portion 28 and another second flat surface portion 28 needs only be an obtuse angle. Each second curved surface portion 30 is formed with a shape closely resembling that of an iso-tensile curved surface.

Among the six second curved surface portions 30 of one of the dome portions 20, one second curved surface portion 30 is adjacent to one first curved surface portion 26 among the six first curved surface portions 26 of the cylinder portion 18. Among the six second curved surface portions 30 of the other of the dome portions 20, one second curved surface portion 30 is adjacent to one first curved surface portion 26 among the six first curved surface portions 26 of the cylinder portion 18.

When the mandrel 10 is viewed from a direction orthogonal to the axial line A direction as shown in FIG. 2, the first curved surface portions 26 and the second curved surface portions 30 are arranged such that the vertex of the hexagonal cylinder portion 18 and the vertex of the hexagonal dome portion 20 are positioned on a straight line. Due to this, as shown in FIGS. 1 and 3, the line B can be set to pass through the vertex of the cylinder portion 18 and the vertex of the dome portion 20.

[Layered Body Formation Method]

FIGS. 6 to 8 are diagrams showing a state in which the wound member 12 is wound around the mandrel 10. FIGS. 6 to 8 show states occurring while the wound member 12 is being wound around the mandrel 10. By repeatedly winding the wound member 12 around the mandrel 10, the layered body 14 in which the fiber-reinforced resin is layered is formed on the surface of the mandrel 10.

FIG. 6 shows a state in which the wound member 12 is wound around the mandrel 10 with the wound member 12 inclined at 67.5° and −67.5° relative to the axial line A. FIG. 7 shows a state in which the wound member 12 is wound around the mandrel 10 with the wound member 12 inclined at 20° and −20° relative to the axial line A. FIG. 8 shows a state in which the wound member 12 is wound around the mandrel 10 with the wound member 12 inclined at 45° and −45° relative to the axial line A.

The mandrel 10 around which the wound member 12 is wound is covered with a film, and the air inside the film is evacuated to realize a vacuum state (bagging). In this state, the mandrel 10 is inserted into a pressure vessel (autoclave), to be pressurized and heated. Due to this, the layered body 14 covering the mandrel 10 is cured. The hardened layered body 14 is cut along the line B, and removed from the mandrel 10.

The vertices of the cylinder portion 18 and the vertices of the dome portion 20 are also vertices of the draft angles. Therefore, by cutting the layered body 14 on the line B that connects the vertex of the cylinder portion 18 and the vertex of the dome portion 20, the layered body 14 can be easily removed from the mandrel 10.

In the present embodiment, a rectangular test piece 16 is collected from the layered body 14 covering the first flat surface portions 24 and the second flat surface portions 28 of the mandrel 10. The test piece 16 is used for the material property evaluation test of the layered body 14. A test piece 16 shaped as a flat plate can be obtained from the layered body 14 covering the first flat surface portions 24 and the second flat surface portions 28.

The mandrel 10 is formed to resemble the liner of a gas tank. Therefore, it is possible to wind the wound member 12 around the mandrel 10 in a direction that is the same as the direction in which the wound member is wound around the liner. Due to this, it is possible to obtain the layered body 14 that has the same structure as an actual layered body formed on the surface of the liner.

[Test Piece Collection Location]

Figure 9:
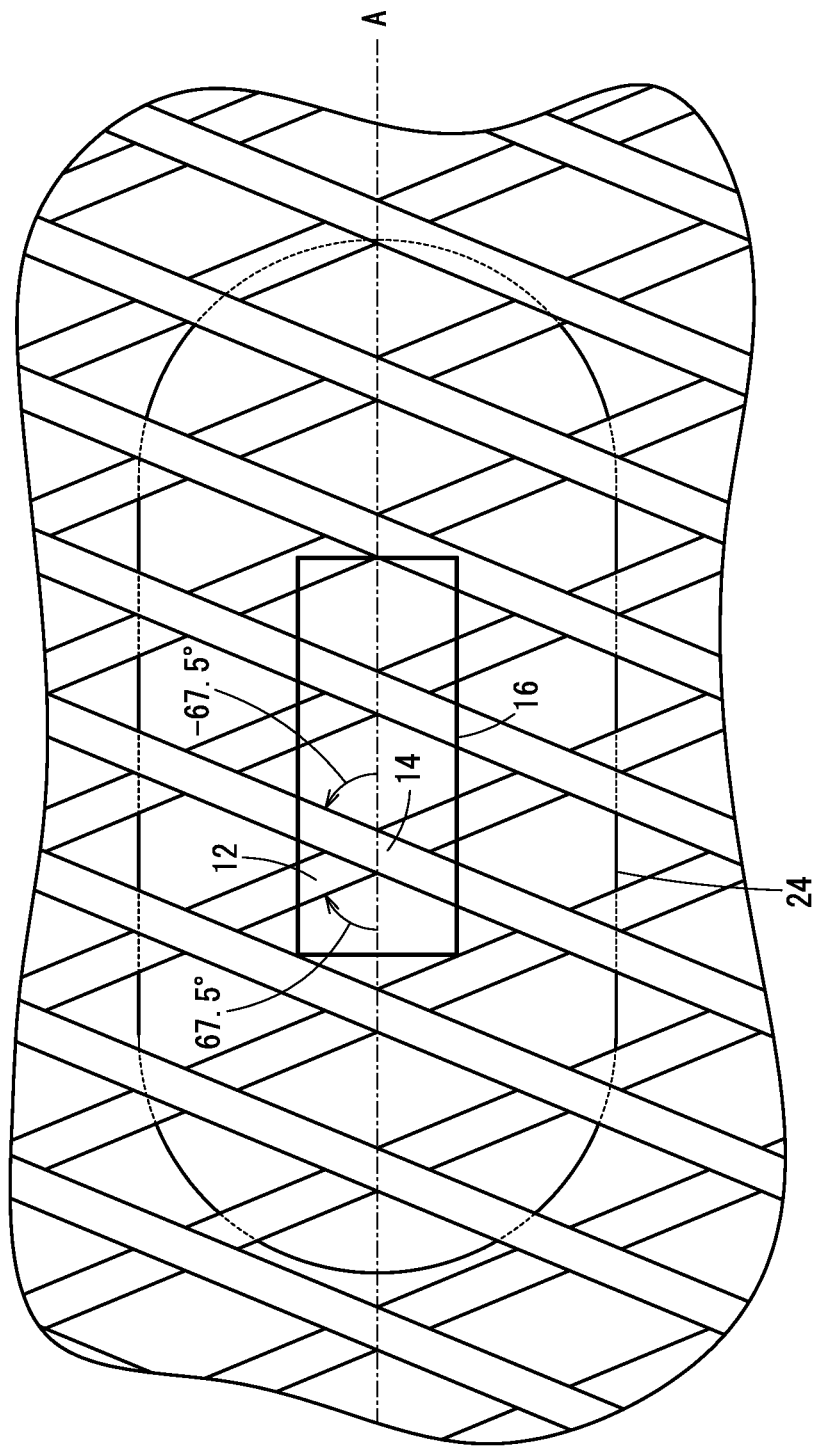
FIG. 9 is a schematic diagram showing a collection location of a test piece in a first flat surface portion.

FIG. 9 is a schematic diagram showing a collection location of a test piece 16 in a first flat surface portion 24. FIG. 9 shows a state in which the wound member 12 is wound around the mandrel 10 with the wound member 12 being inclined at 67.5° and −67.5° relative to the axial line A. In this case, by collecting the test piece 16 such that the longitudinal direction of the test piece 16 becomes substantially parallel to the axial line A, it is possible to obtain the layered body 14 having a layer whose fiber direction relative to the longitudinal direction to the test piece 16 is 67.5° and a layer whose fiber direction relative to the longitudinal direction to the test piece 16 is −67.5°.

Figure 10:
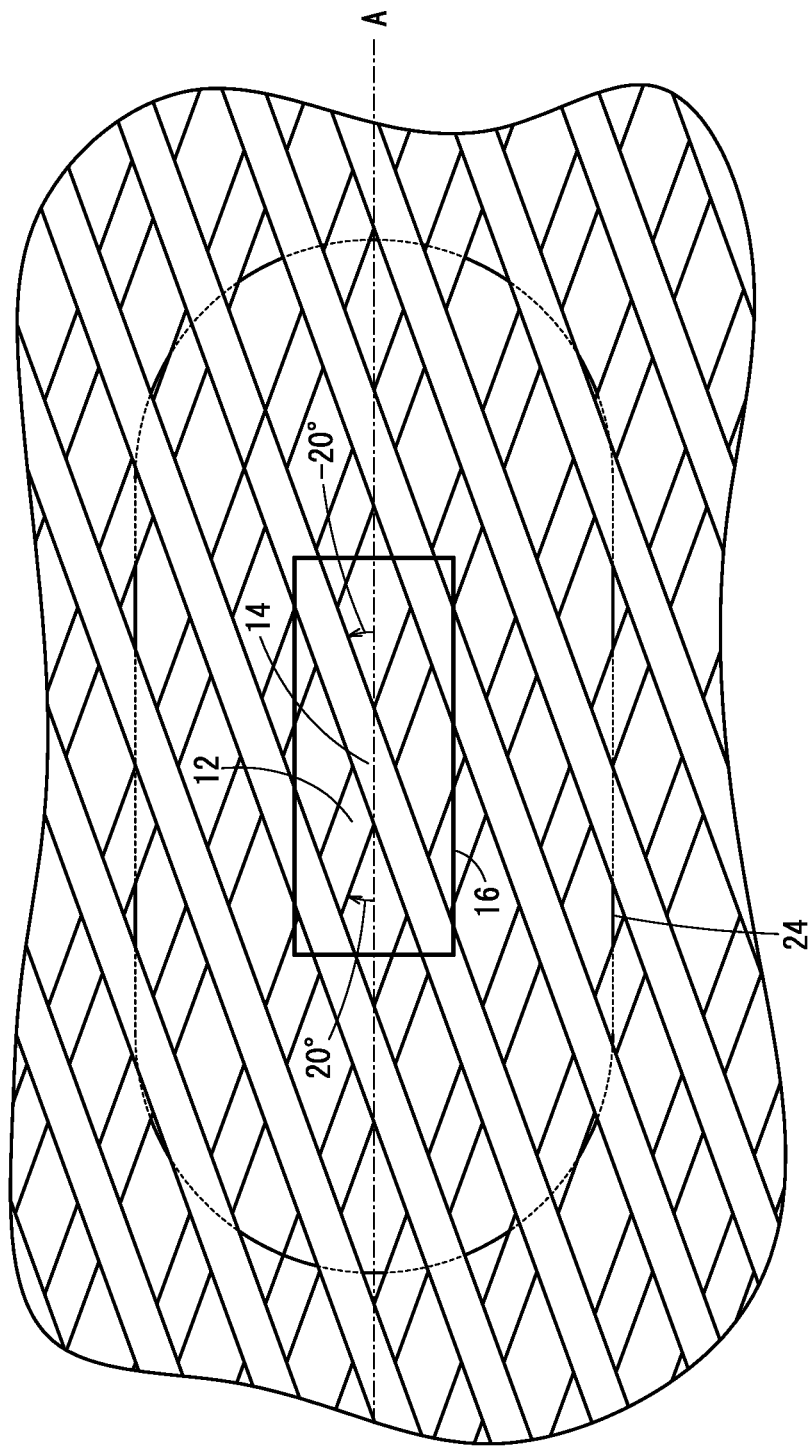
FIG. 10 is a schematic diagram showing a collection location of a test piece in a first flat surface portion.

FIG. 10 is a schematic diagram showing a collection location of a test piece 16 in a first flat surface portion 24. FIG. 10 shows a state in which the wound member 12 is wound around the mandrel 10 with the wound member 12 being inclined at 20° and −20° relative to the axial line A. In this case, by collecting the test piece 16 such that the longitudinal direction of the test piece 16 becomes substantially parallel to the axial line A, it is possible to obtain the layered body 14 having a layer whose fiber direction relative to the longitudinal direction to the test piece 16 is 20° and a layer whose fiber direction relative to the longitudinal direction to the test piece 16 is −20°.

Figure 11:
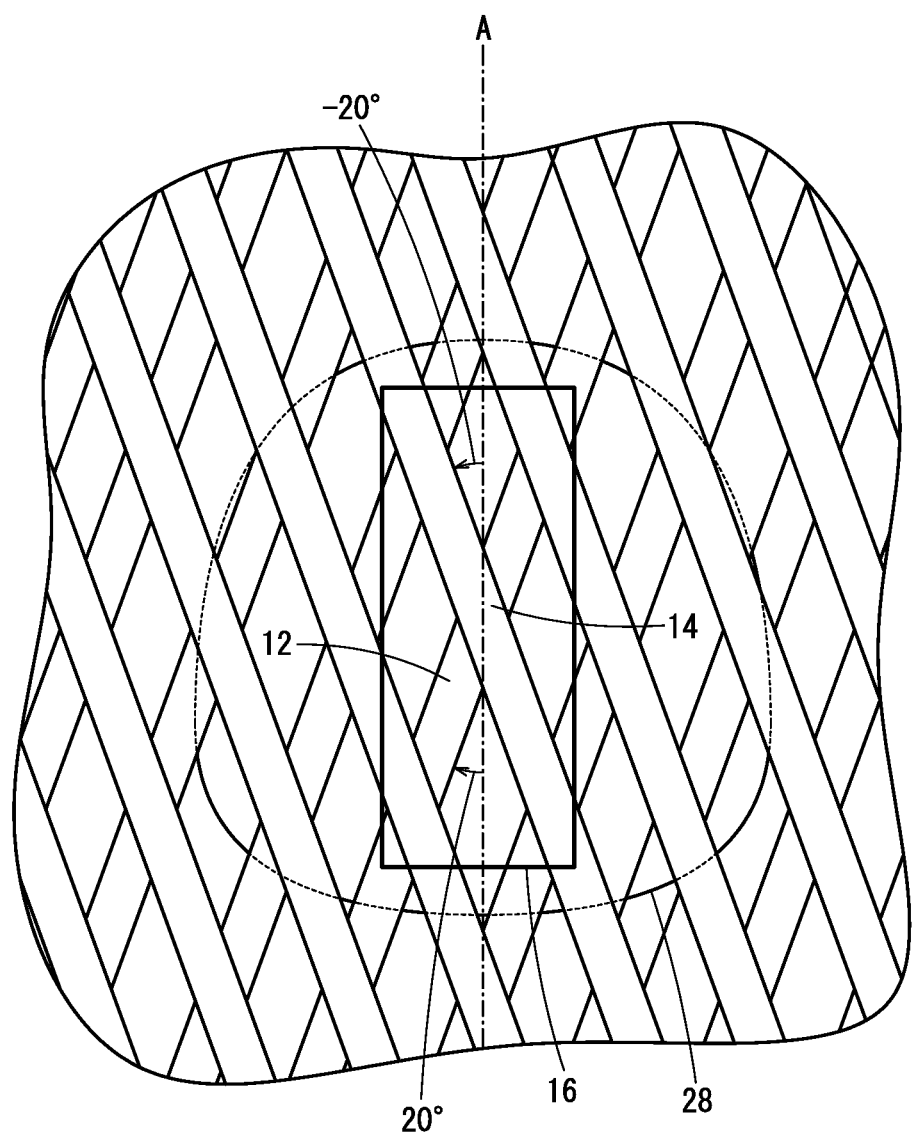
FIG. 11 is a schematic diagram showing a collection location of a test piece in a second flat surface portion.

FIG. 11 is a schematic diagram showing a collection location of a test piece 16 in a second flat surface portion 28. FIG. 11 shows a state in which the wound member 12 is wound around the mandrel 10 with the wound member 12 being inclined at 20° and −20° relative to the axial line A. In this case, by collecting the test piece 16 such that the longitudinal direction of the test piece 16 becomes substantially parallel to the axial line A, it is possible to obtain the layered body 14 having a layer whose fiber direction relative to the longitudinal direction to the test piece 16 is 20° and a layer whose fiber direction relative to the longitudinal direction to the test piece 16 is −20°.

Figure 12:
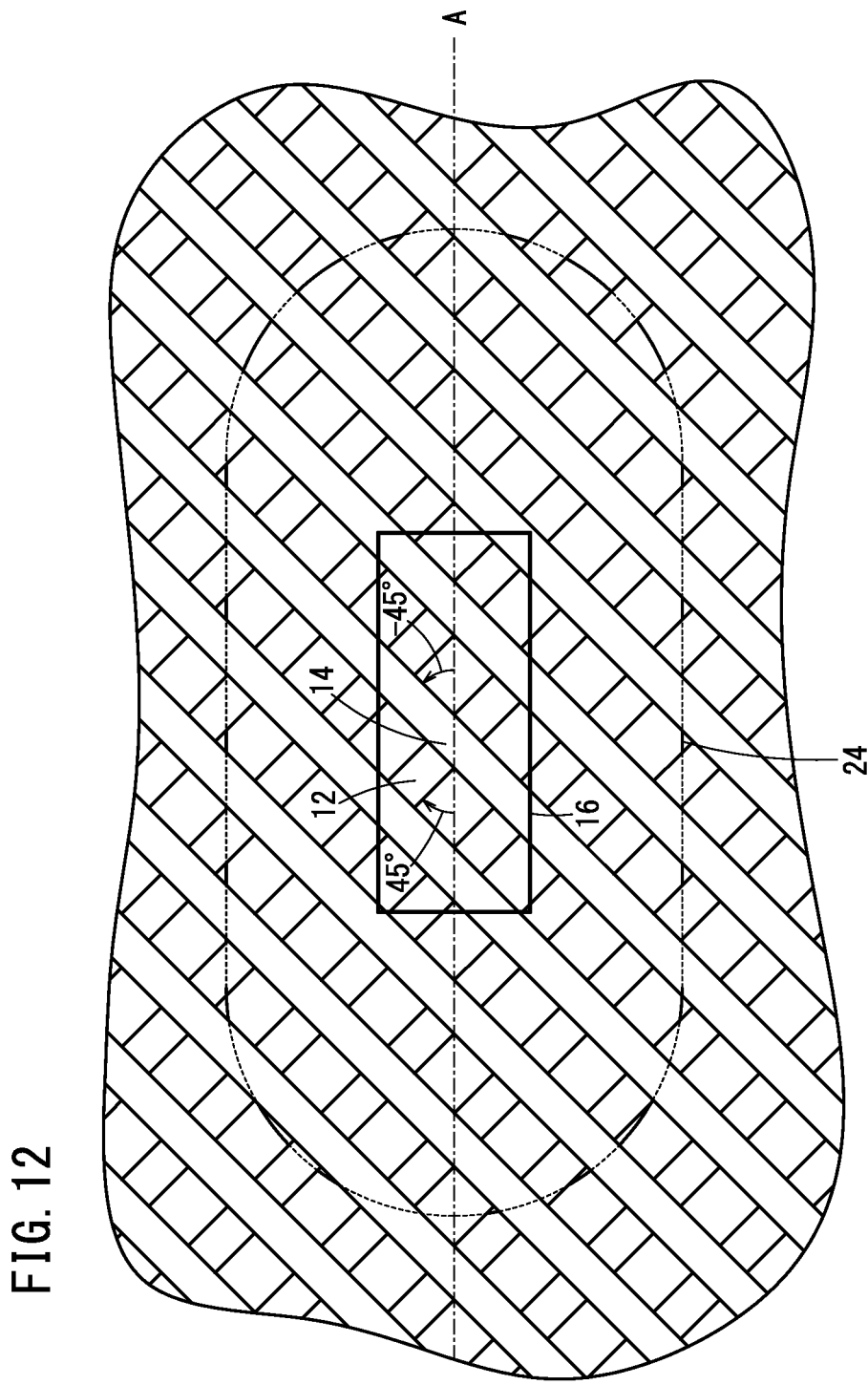
FIG. 12 is a schematic diagram showing a collection location of a test piece in a first flat surface portion.

FIG. 12 is a schematic diagram showing a collection location of a test piece 16 in a first flat surface portion 24. FIG. 12 shows a state in which the wound member 12 is wound around the mandrel 10 with the wound member 12 being inclined at 45° and −45° relative to the axial line A. In this case, by collecting the test piece 16 such that the longitudinal direction of the test piece 16 becomes substantially parallel to the axial line A, it is possible to obtain the layered body 14 having a layer whose fiber direction relative to the longitudinal direction to the test piece 16 is 45° and a layer whose fiber direction relative to the longitudinal direction to the test piece 16 is −45°.

Figure 13:
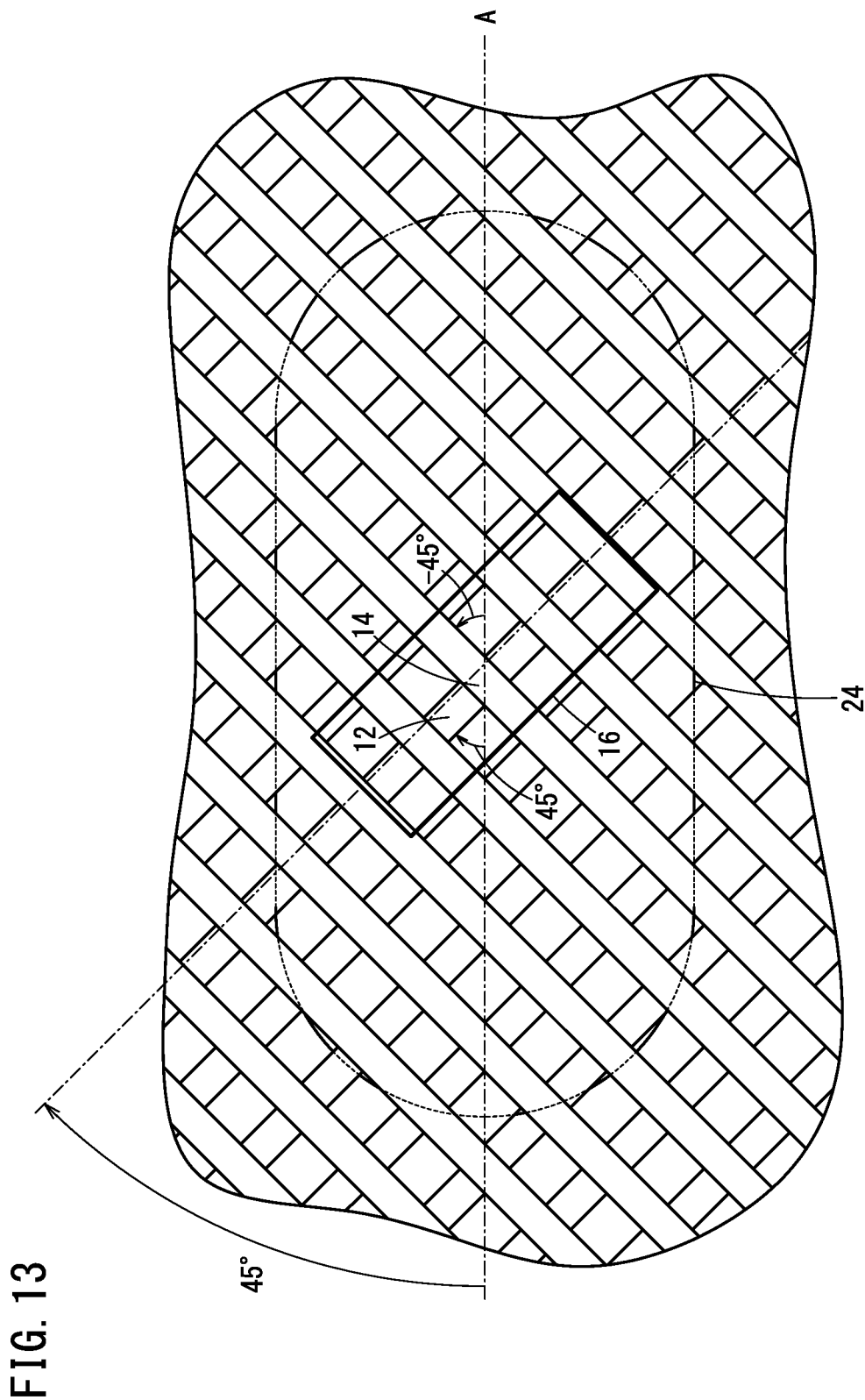
FIG. 13 is a schematic diagram showing a collection location of a test piece in a first flat surface portion.

FIG. 13 is a schematic diagram showing a collection location of a test piece 16 in a first flat surface portion 24. FIG. 13 shows a state in which the wound member 12 is wound around the mandrel 10 with the wound member 12 being inclined at 45° and −45° relative to the axial line A. In this case, by collecting the test piece 16 such that the longitudinal direction of the test piece 16 is at an angle of 45° relative to the axial line A, it is possible to obtain the layered body 14 having a layer whose fiber direction relative to the longitudinal direction to the test piece 16 is 0° and a layer whose fiber direction relative to the longitudinal direction to the test piece 16 is 90°.

Figure 14:
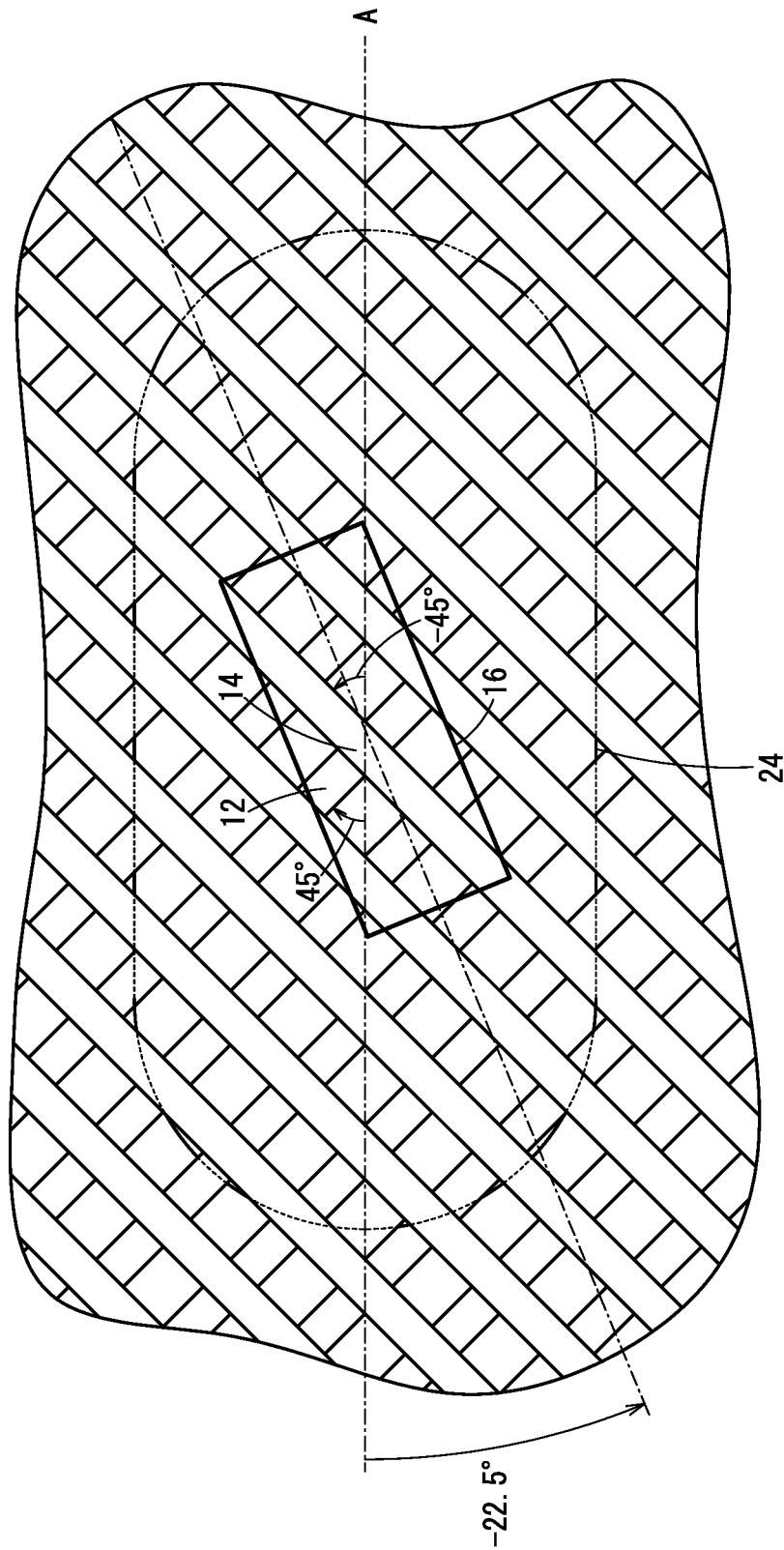
FIG. 14 is a schematic diagram showing a collection location of a test piece in a first flat surface portion.

FIG. 14 is a schematic diagram showing a collection location of a test piece 16 in a first flat surface portion 24. FIG. 14 shows a state in which the wound member 12 is wound around the mandrel 10 with the wound member 12 being inclined at 45° and −45° relative to the axial line A. In this case, by collecting the test piece 16 such that the longitudinal direction of the test piece 16 is at an angle of −22.5° relative to the axial line A, it is possible to obtain the layered body 14 having a layer whose fiber direction relative to the longitudinal direction to the test piece 16 is 67.5° and a layer whose fiber direction relative to the longitudinal direction to the test piece 16 is −22.5°.

The mandrel 10 of the present embodiment includes the first flat surface portions 24 in the cylinder portion 18 and the second flat surface portions 28 in the dome portion 20. A layered body 14 formed on a first flat surface portion 24 and a layered body 14 formed on a second flat surface portion 28 are shaped as flat plates. Therefore, a test piece 16 collected from a region covering a first flat surface portion 24 and a test piece 16 collected from a region covering a second flat surface portion 28 are also shaped as flat plates. Therefore, in the material property evaluation test, it is easier to handle a case where the test piece 16 has a flat plate shape than to handle a case where the test piece 16 has a curved shape.

[Test Piece Collection Process]

Figure 15:
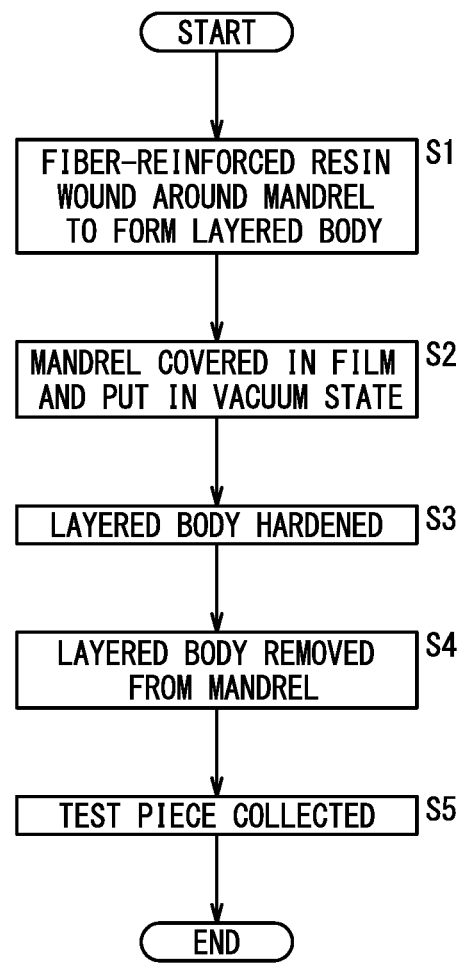
FIG. 15 is a flow chart showing a test piece collecting process.

FIG. 15 is a flow chart showing a test piece collection process. Part of the test piece collection process may be performed manually by an operator. Part of the test piece collection process may be performed automatically by a robot or the like.

At step S1, the wound member 12 formed of the fiber-reinforced resin is wound around the mandrel 10 to form the layered body 14. After this, the process transitions to step S2.

At step S2, the mandrel 10 around which the wound member 12 is wound is covered in film, and the air inside the film is evacuated to realize a vacuum state. After this, the process transitions to step S3.

At step S3, the mandrel 10 is inserted into a pressure vessel (autoclave), and the layered body 14 is pressurized and heated to cure the layered body 14. After this, the process transitions to step S4.

At step S4, the cured layered body 14 is cut and removed from the mandrel 10. After this, the process transitions to step S5.

At step S5, a test piece 16 is collected from each of a region of the layered body 14 covering a first flat surface portion 24 and a region of the layered body 14 covering a second flat surface portion 28. After this, the test piece collecting process ends.

With regard to the above disclosure, following additional notes are also disclosed.

APPENDIX 1

The mandrel (10) around which fiber-reinforced resin is wound, the mandrel comprising: the cylinder portion (18) that has the plurality of first flat surface portions (24); and the pair of dome portions (20) that are formed at respective ends of the cylinder portion and each have the plurality of second flat surface portions (28). According to such a configuration, in the layered body covering the mandrel, it is possible to make the test piece collected from the region covering a first flat surface portion and the test piece collected from the region covering a second flat surface portion each have a flat plate shape.

APPENDIX 2

In the mandrel according to Appendix 1, the cylinder portion may further include the first curved surface portion (26) that connects one of the first flat surface portions and another of the first flat surface portions that is adjacent to the one first flat surface portion; and each of the dome portions may further include the second curved surface portion (30) that connects one of the second flat surface portions and another of the second flat surface portions that is adjacent to the one second flat surface portion. According to such a configuration, the wound member wound around the first flat surface portions can be pressed firmly against the first flat surface portions. Furthermore, the wound member wound around the second flat surface portions can be pressed firmly against the second flat surface portions.

APPENDIX 3

In the mandrel according to Appendix 2, the cylinder portion may include the plurality of first curved portions including the first curved portion, and each of the dome portions may include the plurality of second curved portions including the second curved portion, and the first curved surface portion may be adjacent to the second curved surface portion. According to such a configuration, the layered body covering the mandrel can be continuously cut along the first curved surface portion and the second curved surface portion.

APPENDIX 4

In the mandrel according to any one of Appendixes 1 to 3, an inner angle formed between one of the first flat surface portions and another of the first flat surface portions that is adjacent to the one first flat surface portion may be an obtuse angle; and the inner angle formed between one of the second flat surface portions and another of the second flat surface portions that is adjacent to the one second flat surface portion may be an obtuse angle. According to such a configuration, the wound member wound around the first flat surface portions can be pressed firmly against the first flat surface portions. Furthermore, the wound member wound around the second flat surface portions can be pressed firmly against the second flat surface portions.

APPENDIX 5

In the mandrel according to any one of Appendixes 1 to 4, when the mandrel is viewed from the axial direction, the external shape of the cylinder portion may be a polygonal shape with rounded corners, having five or more vertices. According to such a configuration, the external shape of the mandrel can be made closer to the shape of the liner of a gas tank.

APPENDIX 6

In the mandrel according to any one of Appendixes 1 to 5, each of the dome portions may include a number of the second flat surface portions equal to the number of the first flat surface portions of the cylinder portion. According to such a configuration, it is possible to cause substantially the same tensile force to act in all directions on the layered body covering the first flat surface portions. Furthermore, it is possible to cause substantially the same tensile force to act in all directions on the layered body covering the second flat surface portions.

APPENDIX 7

A test piece collecting method of collecting a test piece (16) made from the fiber-reinforced resin wound around the mandrel of any one of Appendixes 1 to 6, the test piece collecting method comprising: a layering step of winding the fiber-reinforced resin having a belt shape around the cylinder portion and the dome portions, to form a layered body in which the fiber-reinforced resin is layered; a curing step of curing the layered body; and a collecting step of collecting a test piece from each of a region of the layered body covering one of the first flat surface portions and a region of the layered body covering one of the second flat surface portions. In this manner, in the layered body covering the mandrel, it is possible to make the test piece collected from the region covering a first flat surface portion and the test piece collected from the region covering a second flat surface portion each have a flat plate shape.

The present invention is not limited to the above disclosure, and various configurations can be adopted without deviating from the gist or scope of the present invention.

The invention claimed is:

1. A mandrel around which fiber-reinforced resin is wound, the mandrel comprising:
   a cylinder portion that has a plurality of first flat surfaces; and
   a pair of dome portions that are formed at respective ends of the cylinder portion and each have a plurality of second flat surfaces,
   wherein the first flat surfaces and the second flat surfaces are discontinuous with each other.

2. The mandrel according to claim 1, wherein:
   the cylinder portion further includes a first curved surface that connects one of the first flat surfaces and another of the first flat surfaces that is adjacent to the one of the first flat surfaces; and
   each of the dome portions further includes a second curved surface that connects one of the second flat surfaces and another of the second flat surfaces that is adjacent to the one of the second flat surfaces.

3. The mandrel according to claim 2, wherein:
   the cylinder portion includes a plurality of first curved surfaces including the first curved portion, and each of the dome portions includes a plurality of second curved surfaces including the second curved portion, and
   the first curved surface is adjacent to the second curved surface.

4. The mandrel according to claim 1, wherein:
   an inner angle formed between one of the first flat surfaces and another of the first flat surfaces that is adjacent to the one first flat surface is an obtuse angle; and
   an inner angle formed between one of the second flat surfaces and another of the second flat surfaces that is adjacent to the one second flat surface is an obtuse angle.

5. The mandrel according to claim 1, wherein:
   when the mandrel is viewed from an axial direction, an external shape of the cylinder portion is a polygonal shape with rounded corners, having five or more vertices.

6. The mandrel according to claim 1, wherein:
   each of the dome portions includes a number of the second flat surfaces equal to the number of the first flat surfaces of the cylinder portion.

7. A test piece collecting method of collecting a test piece made from a fiber-reinforced resin wound around a mandrel including a cylinder portion that has a plurality of first flat surfaces; and a pair of dome portions that are formed at respective ends of the cylinder portion and each have a plurality of second flat surfaces with the first flat surfaces and the second flat surfaces being discontinuous with each other, the test piece collecting method comprising:
   a layering step of winding the fiber-reinforced resin having a belt shape around the cylinder portion and the dome portions, to form a layered body in which the fiber-reinforced resin is layered;
   a curing step of curing the layered body; and
   a collecting step of collecting a test piece from each of a region of the layered body covering one of the first flat surfaces and a region of the layered body covering one of the second flat surfaces.

* * * * *